United States Patent [19]

Cerny

[11] Patent Number: 4,527,522
[45] Date of Patent: Jul. 9, 1985

[54] IGNITION TIMING CONTROL SYSTEM

[75] Inventor: Robert S. Cerny, Bainbridge, N.Y.

[73] Assignee: Allied Corporation, Morristown, N.J.

[21] Appl. No.: 457,555

[22] Filed: Jan. 13, 1983

[51] Int. Cl.³ .............................................. F02P 5/04
[52] U.S. Cl. .................................. 123/416; 123/415; 123/643
[58] Field of Search ................ 123/415, 416, 488, 643

[56] References Cited

U.S. PATENT DOCUMENTS

| | | | |
|---|---|---|---|
| 3,853,103 | 12/1974 | Wahg | 123/416 |
| 4,099,507 | 7/1978 | Pagel | 123/416 |
| 4,112,887 | 9/1978 | Chateau | 123/416 |
| 4,127,092 | 11/1978 | Fresow | 123/416 |
| 4,128,885 | 12/1978 | Valek | 123/416 |
| 4,164,926 | 8/1979 | Kindlmann | 123/415 |
| 4,178,893 | 12/1979 | Aoki | 123/424 |
| 4,300,503 | 11/1981 | Deleris | 123/415 |

*Primary Examiner*—Ronald B. Cox
*Attorney, Agent, or Firm*—Bruce L. Lamb; Robert M. Trepp

[57] ABSTRACT

An ignition timing control system for an internal combustion engine (18) varies the timing of a magneto (14) in accordance with a pre-programmed ignition advance schedule. An optical pick-up (22) senses the passage of slots (26) in a disc (24) which is rotated at the speed of a distributor (16) and produces constant angular width reference pulses corresponding to fixed ignition timing in the engine's cylinders (13). A magnetic pick-up (36) detects incremental rotation of the engine's crankshaft (33) and produces timing control signals proportional to engine speed. The timing control signals and reference pulses are converted to a multi-bit data word which is used to synthesize an analog control function representing variable ignition timing using a pre-programmed digital to analog converter (58). A speed controlled switch (70) gates ignition trigger signals corresponding to the fixed timing of the reference pulses when engine speed is below a preselected value but gates ignition trigger signals corresponding to the variable ignition timing of the preprogrammed ignition advance schedule when engine speed exceeds the pre-selected value.

14 Claims, 7 Drawing Figures

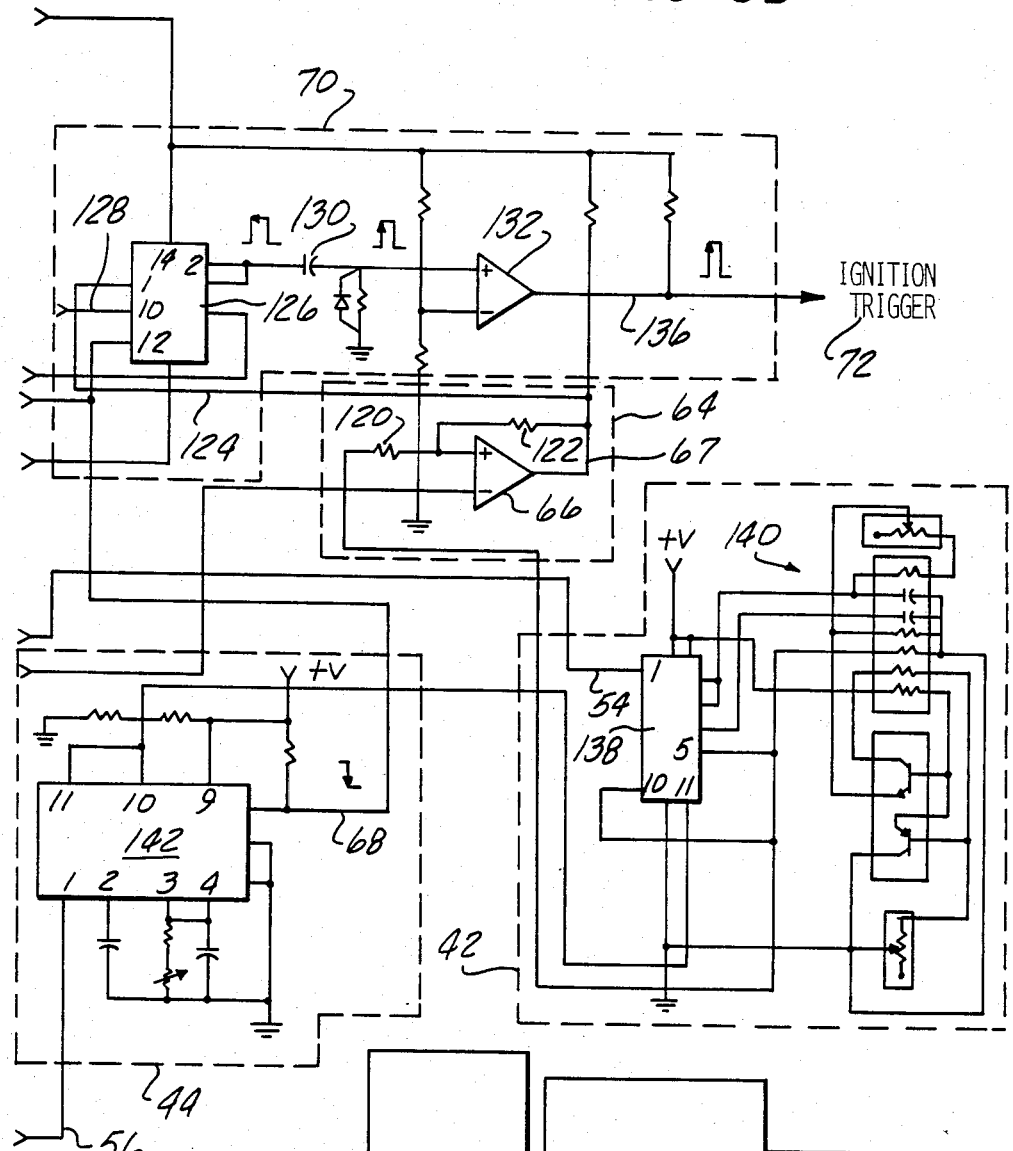

IGNITION TIMING CONTROL SYSTEM

This invention relates to an ignition timing control system for an internal combustion engine and deals more specifically with a system for varying timing of a magneto with engine speed in accordance with a preprogrammed ignition advance schedule.

Conventional ignition systems for internal combustion engines generate timing pulses, which indicate the instant during the piston stroke that the associated spark plugs should be fired, and distributes these pulses to the individual spark plugs causing them to fire in a predefined order.

In connection with a breakerless type ignition system it is known to produce timing signals for spark plug firing using a magnetic pick-up to sense rotation of vane elements driven by the engine's crankshaft. A change in ignition timing is obtained by altering the width of pulses output from the magnetic pick-up; however, the amount of ignition timing change is limited to the width of a pulse which is received from the magnetic pick-up. One method of increasing the available timing change involves the use of a frequency multiplier in order to multiply the frequency of the signals output by the magnetic pick-up. However, frequency multipliers are limited in the range that multiplication can be effected thus precluding their use in an ignition system where wide speed ranges are encountered.

Another type of ignition system of interest is disclosed in U.S. Pat. No. 4,269,152 issued May 26, 1981 and entitled "Breakerless Pulse Distribution System and Opto-Electrical Distributor Therefor". This patent discloses a breakerless distributor for an internal combustion engine ignition system in which a number of light emitting diodes equal to the number of engine cylinders are connected in series for simultaneous energization by the timing pulses. A photo transistor arranged in spaced, confronting relationship to the light emitting diodes is connected to a silicon controlled rectifier which triggers the energizing circuit for an individual spark plug each time the photo transistor is turned on by emissions from its associated light emitting diode.

None of the items discussed above overcome the problem of increasing the multiplying range of a frequency multiplier in order to increase the available timing range.

DISCLOSURE OF THE INVENTION

This invention provides an ignition timing control system for internal combustion engine which varies ignition timing in accordance with a preprogrammed ignition advance schedule. The system is characterized by an optical pick-up which senses the passage of slots in a disc which is rotated at the speed of a distributor and produces constant width angular reference pulses corresponding to fixed ignition timing for each of the engine's cylinders. A magnetic pick-up detects incremental rotation of the engine's crankshaft and produces timing control signals proportional to the engine's speed. The timing control signals and reference pulses are converted to a multi-bit data word which is used to synthesize an analog control function representing variable ignition timing using a preprogrammed digital to analog converter. A speed controlled switch gates ignition trigger singals corresponding to the fixed timing of the reference pulses when the engine speed is below a pre-selected value but gates ignition trigger signals corresponding to the variable ignition timing of the preprogrammed ignition advance schedule when the engine speed exceeds the pre-selected value.

Accordingly, it is an important advantage of the invention to provide a greater range of change in ignition timing compared to prior art systems. A related advantage of the invention consists of its ability to provide a wide range of ignition timing using a frequency multiplier to multiply the frequency of ignition pulses wherein the multiplier has a relatively low range of multiplication spread. Another advantage of the invention is its ability to provide a relatively simple means for synthesizing an ignition timing curve as a function of speed and/or other variables as required for a specific engine through the use of a programmable D to A converter.

Another advantage of the invention involves the use of a single sensor which generates timing pulses providing an indication of both start and advance timing reference positions for each of the cylinders.

DETAILED DESCRIPTION OF THE INVENTION

Figure 1:
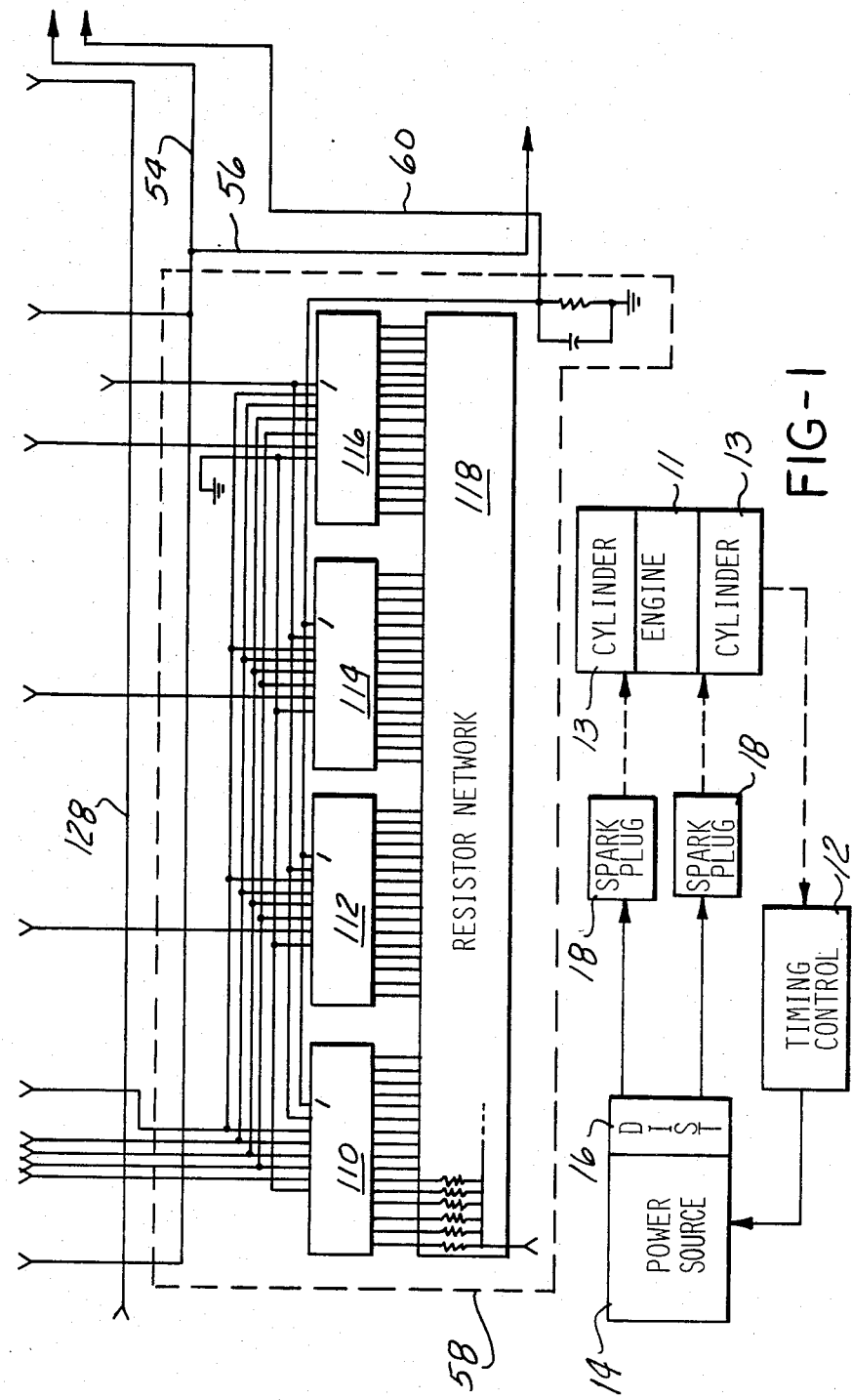
FIG. 1 is a block diagram of an ignition system for an internal combustion engine employing the timing control system of the present invention.
Figure 2:
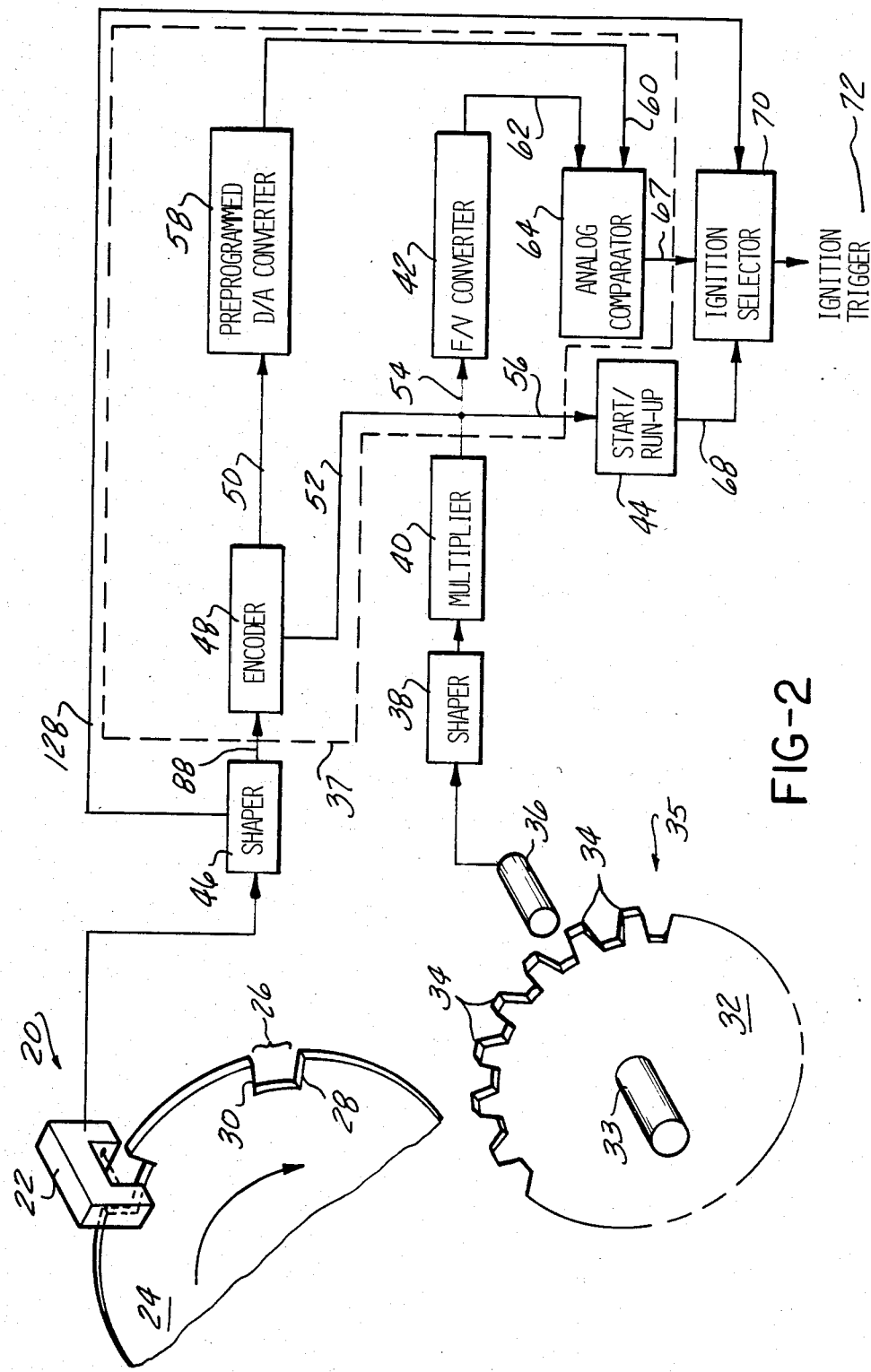
FIG. 2 is a combined block diagram and diagrammatic view of the ignition timing control system which forms the preferred embodiment of the present invention.

FIGS. 3a–3d, taken together, form a detailed schematic diagram of the ignition timing control system shown in FIGS. 1 and 2; and, FIG. 4 is a plan view showing how FIGS. 3a–3d are to be arranged for proper viewing.

Referring to FIG. 1, an internal combustion engine 11 includes a plurality of combustion cylinders 13 each provided with associated spark plug 18 for igniting combustion of fuel therein. Electrical ignition signals are delivered to the spark plugs 18 from an electrical power source 14 by means of a distributor 16. Power source 14 may typically comprise a breakerless device including a conventional magneto. The timing of the ignition system signals delivered to the spark plugs 18 by distributor 16 is determined by a timing control 12 which receives information from the engine 12 relating to the speed of the engine.

FIG. 2 is a block diagram and diagrammatic view of ignition timing control system depicting the manner in which the position of the engine's crankshaft 33 is encoded using a pair of input reference signals. First means 20 for generating a plurality of reference pulses includes a disc 24 rotated at the speed of the distributor 16 by any suitable power source such as a gear train driven by the engine 11. The disc 24 includes a plurality of slots 26 in the periphery thereof respectively corresponding to the engine's cylinders 13. The slots 26 are defined by a leading edge 28 and a trailing edge 30. An optical sensor 22 disposed adjacent the periphery of disc 24 senses the passage of the leading and trailing edges 28 and 30 respectively of the slot 26 and delivers an output pulse to a shaper 46, the width of such pulse being proportional to the angle subtended by the slot 26. The reference pulses produced by the first generating means 20 are of constant angular width and are associated with fixed ignition timing in the cylinders 13. The leading edge 28 of each of the slots 26 corresponds to the maximum ignition timing advance for the associated cylinder.

Means 35 for sensing the incremental rotation of the crankshaft 33 includes a gear member 32 driven by crankshaft 33 which includes a plurality of gear teeth 34, the rotation of gear teeth 34 being sensed by a conventional magnetic pick-up 36. Magnetic pickup 36 produces timing control signals which are processed by a pulse shaper 38 and multiplied in frequency by a frequency multiplier 40. The multiplied timing control signals output from multiplier 40 are delivered to one input of second means 37 for generating selectively variable timing signals. The shaper 46 delivers the reference pulses to a second input to the second generating means 37.

The second generating means includes an encoder 48 delivering signals on line 50 to a preprogrammed D/A (digital to analog) converter 58; a frequency-to-voltage converter 42 receiving signals from multiplier 40; and an analog comparator 64 receiving signals from converters 58 and 42 on lines 60 and 62 respectively. The timing control signals output from multiplier 40 are also delivered to a start/runup circuit 44 whose output on line 68 controls an ignition selector 70. Ignition selector 70 also receives signals on line 67 from the analog comparator 64 and on line 128 from shaper 46. The output of ignition selector 70 forms ignition trigger signals 72 which are delivered to the power source 14 in order to control the ignition timing of the latter.

The details of the ignition timing control system are shown in the schematic diagram of FIGS. 3A–3D. The optical pick-up 22 includes a conventional optical interrupter comprising a light emitting diode 25 and photosensitive transistor 27 positioned on opposite sides of disc 24. The output of the optical pick-up 22 is delivered to the input of a pulse shaper 46 which comprises a Schmitt trigger 80, inverter 82, RC network 85 and inverting amplifier 84. One of the outputs of shaper 46 which corresponds to the leading edge 28 of optical slot 26 is delivered on line 88 to one input of encoder 48 shown in FIG. 3B which comprises a pair of programmable up/down counters 100 and 102 that are commonly referred to in the industry as 4516 chips. Counters 100 and 102 include a pair of respectively associated, manually operable presets 104 and 106. Encoder 48 further includes a quadruple NOR gate package 74 commonly referred to as a 4011 chip. The outputs of counters 100, 102 are delivered via lines 50 to the input of the programmed D/A converter 58 shown in FIG. 3C. Converter 58 broadly comprises a plurality of 4067 demultiplexer chips 110–116 which are interconnected with the resistor network 118.

The output of converter 58 is delivered on line 60 to the negative input of analog comparator 64 (FIG. 3D). Comparator chip 64 includes a comparator chip 66 having an output 67 connected in feedback through resistor 122 to the positive input thereof, the positive input of comparator chip 66 being connected via resistor 120 to the frequency-to-voltage converter 42. The output of comparator 64 is delivered on line 67 to an ignition trigger 72 comprising a bilateral switch 126 and amplifier 132. Switch 126 may be of a 4066 type chip having an output coupled through capacitor 130 to the positive input of amplifier 132, the negative input thereto being connected through resistor 134 to ground. The output line 136 of op amp 132 delivers the ignition trigger pulses 72. A second input to switch 126 is received on line 68 from the start/run-up circuit 44 which comprises a conventional frequency to voltage converter 142 which may comprise, by way of example, a 2907 chip. A third input to switch 126 is received on line 128 from the shaper 46.

The frequency to voltage converter 42 comprises a conventional frequency-to-voltage converter chip 138 of the 2907 type.

Figure 3A:
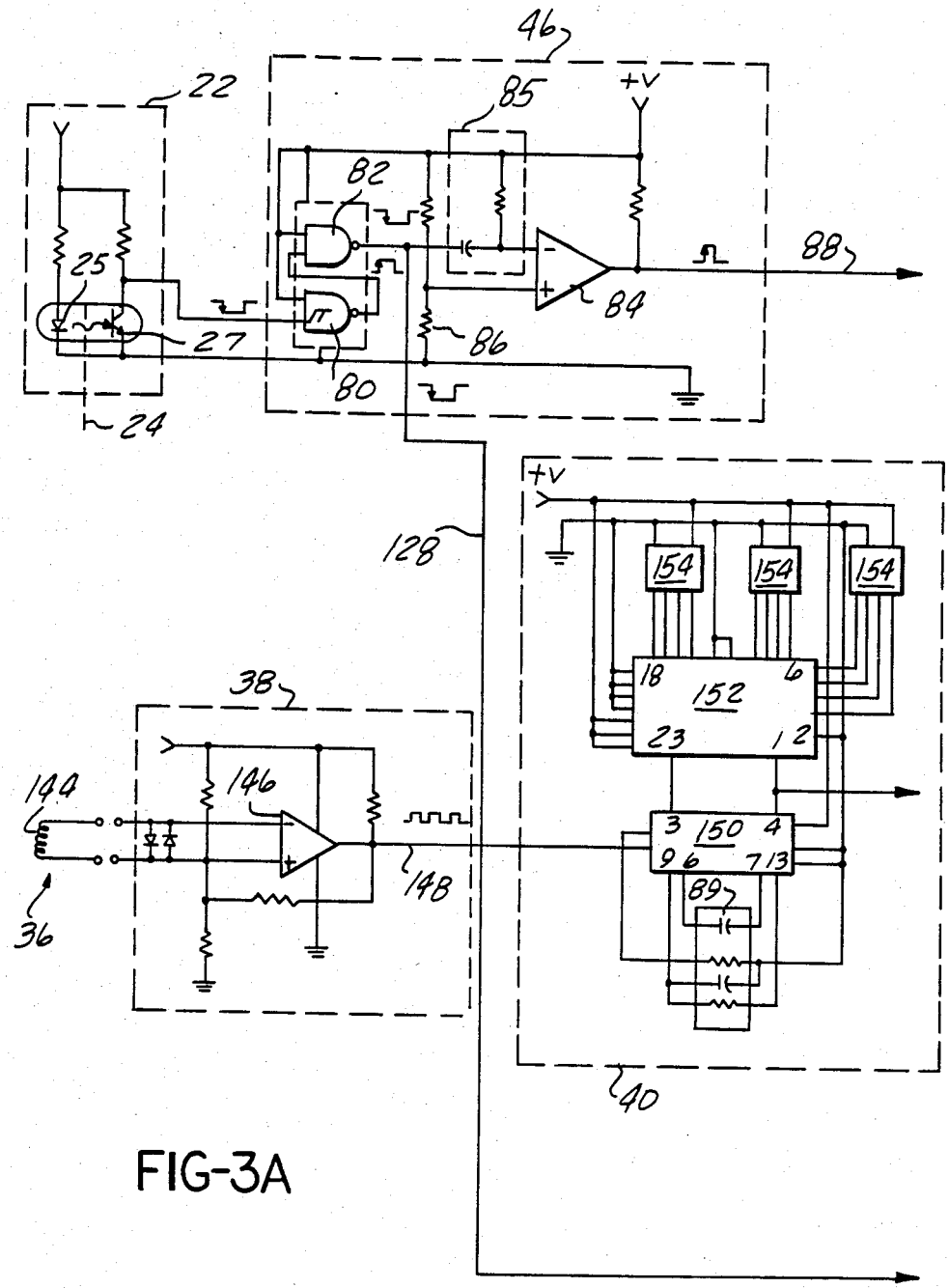
Figure 3B:
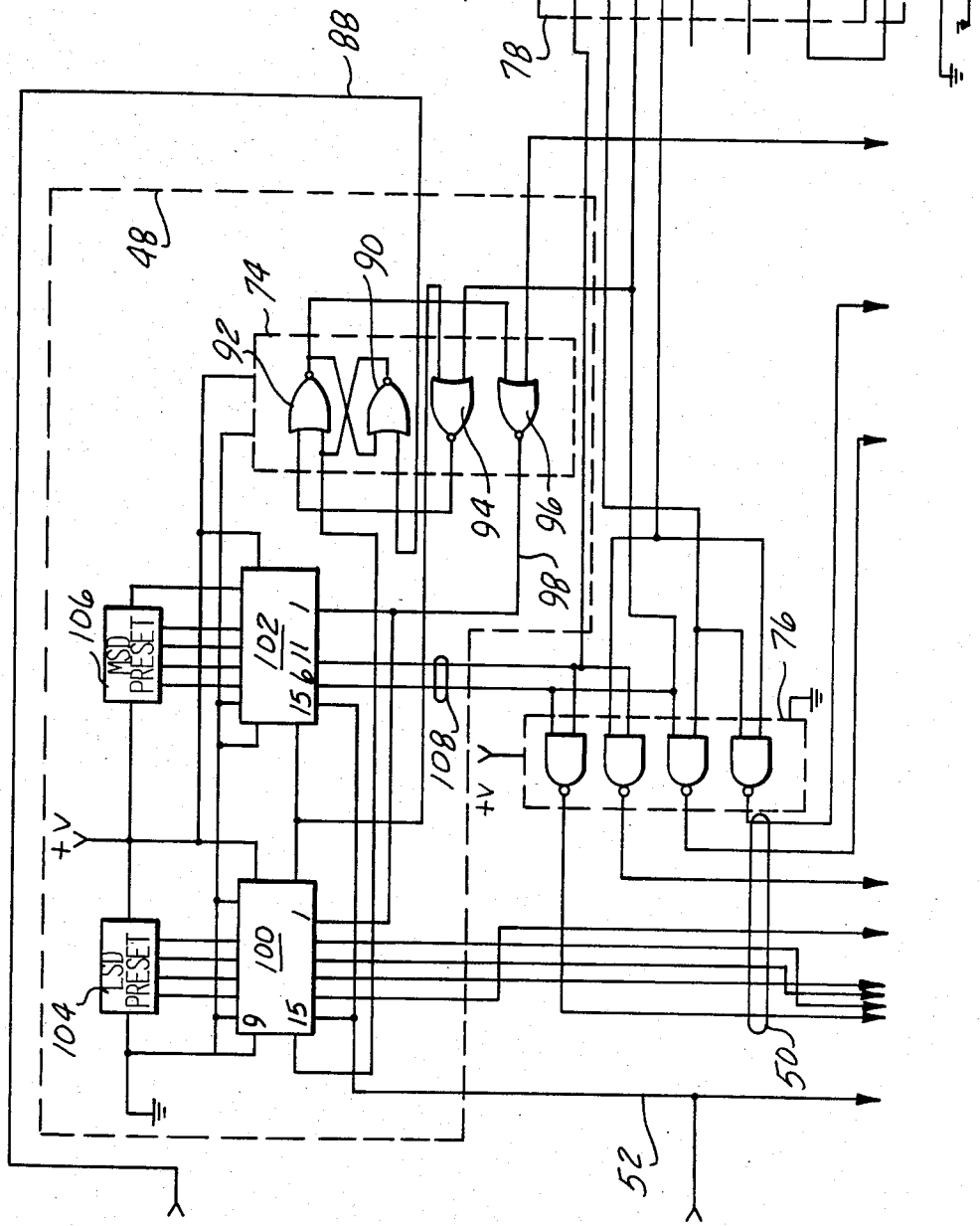

As shown in FIG. 3A, the magnetic pick-up 36 includes a coil 144 which delivers signals to shaper 38, and more particularly, to an amplifier 146. The output of shaper 38 is delivered via line 148 to multiplier 40 which comprises a phase locked loop 150 connected to a divide-by-N counter 152. A plurality of pre-sets 154 coupled with counter 152 determine the divide rate of the latter. Counter 152 may comprise a 4059 chip while a conventional 4046 chip may be employed as the phase lock loop 150.

The frequency multiplier 40 is of conventional design in which the programmable counter 152 is connected in the feedback loop between the VCO (voltage controlled oscillator) output and the comparator input of the phase locked loop 150. By programming counter 152 using pre-sets 154, the multiplication factor may be changed in integral steps from 3 to 9999. Various frequency ranges may be accomodated by selecting a particular value for the capacitor 89 connected between pins 6 and 7 of the phase locked loop 150. The operating range of the phase lock loop 150 will depend on engine speed range, the number of teeth on gear 32, the speed of the gear 32 relative to the crankshaft 33 (assuming that a direct drive relationship does not exist therebetween) and the setting of counter 152. The capture and lock range of the phase locked loop 150 will be limited by the dynamic range of its internal VCO, supply voltage level, ripple content at the VCO input as well as the presence of the counter between the VCO output and the comparator input.

As shown in FIG. 3C, the preprogrammed D/A converter 58 consists of four single 16 channel demultiplexers 110–116 interconnected to form a "one of 64" selector switch addressed by an 8-bit select word received from the encoder 48. The demultiplexer switches 110–116 are employed to select resistors forming an upper leg of a voltage divider defined by resistor network 118. In the particular configuration depicted in the drawings, the converter 58 employs two of the 64 available positions to provide an upper and lower advance limit. Sixty-two positions are left for use in synthesizing a particular advance timing curve.

FIG. 4 is a plan view showing how FIGS. 3a–3d should be arranged for proper viewing.

Referring to FIGS. 1, 3A–3D, the operation of the ignition timing control system is as follows. Constant angular width reference pulses derived from the optical pick-up 22 are delivered to shaper 46 which outputs signals on lines 88 and 128. The NAND Schmitt trigger 80 squares up the signal output from pick-up 22 and delivers the squared up signal to the input of a second NAND Schmitt trigger 82 which merely functions to invert the signal. The output of NAND Schmitt trigger 82 is a square wave pulse having a width representative of the width of the slot 26 in shutter wheel 24. This square wave pulse is delivered on line 128 to the ignition selector switch 126. The output of NAND Schmitt trigger 82 is also delivered to the RC network 85 which differentiates the negative going leading edge of the square wave pulse; the differentiated pulse is squared up and inverted by amplifier 84 and the resulting signal on line 88 is a narrow square wave pulse with the leading positive edge thereof corresponding to the passage of the leading edge 28 of shutter wheel 24 past the optical pick-up 22. The signal on line 88 toggles the cross-coupled latch formed by NOR gates 90 and 92, thereby enabling the down counters 100, 102 which are in turn decremented by the multiplied degree reference signal on control line 52.

Timing control signals produced by the magnetic pick-up 36 are altered by shaper 38 and then delivered to multiplier 40. Multiplier 40 multiplies the frequency of the timing control signals in accordance with the setting of counter 152 as determined by pre-sets 154. The multiplied timing control signals are delivered via line 52 to encoder 48, to the frequency-to-voltage converter 42 via line 54 and to the input of the start/run-up circuit 44 via line 56. As previously indicated, the reference pulses developed by the first generating means 20 and timing control signals generated by sensing means 35 provide information necessary to encode the rotational position of crankshaft 33. The slots 26 are positioned such that the leading edges therefore utilized to provide reference pulses representing the most advanced ignition timing position for the particular engine 12. Each successive timing control signal output from multiplier 40 is thus retarded by an amount equal to the incremental resolution of the system. Timing is therefore controlled and varied by counting the appropriate number of increments following the pulse generated by optical pick-up 22. Signals in serial format delivered to the encoder 48 on lines 52 and 88 are converted into a multibit digital word defining the instantaneous rotational position of crankshaft 33; the data word is updated each multiplied sensed increment of rotation of crankshaft 33. The parallel output of counter 102 is delivered through a bank of NAND gates 76 and is combined with the parallel outputs of counter 100 to form lines 50 which delivers the data word to the demultiplexers 110–116. The preprogrammed D/A converter 58 is employed as a control function generator which synthesizes the speed versus advance characteristic of the variable timing signals. The signals output from converter 58 are delivered on line 60 to the negative input of comparator 66 and are compared with signals on the positive input thereof received via line 62 from the frequency-to-voltage converter 42.

The frequency-to-voltage converter 42 converts the frequency of the multiplied timing control signals received on line 54 to a signal having a voltage proportional to the rotational speed of crankshaft 33. The parallel output of counter 102 is delivered through a bank of NAND gates 76 and is combined with the parallel outputs of counter 100 to form lines 50 which delivers the data word to the demultiplexers 110–116. The preprogrammed D/A converter 58 is employed as a control function generator which synthesizes the speed versus advance characteristic of the variable timing signals. The signals output from converter 58 are delivered on line 60 to the negative input of comparator 66 and are compared with signals on the positive input thereof received via line 62 from the frequency-to-voltage converter 42.

The frequency-to-voltage converter 42 converts the frequency of the multiplied timing control signals received on line 54 to a signal having a voltage proportional to the rotational speed of crankshaft 33. The resulting voltage signal on line 62 output from converter 42, in combination with the signal output from the D/A converter 58 on line 60 defines the pre-programmed speed-versus-advance characteristic for the timing control signals. These two latter mentioned signals are compared in the analog comparator 64 and an output signal from comparator 64 on line 67 is produced when the speed signal on line 62 is at least as great as the signal on line 60. The output signal on line 67 is delivered to the input pin one, of switch 126, thereby causing the latter to output ignition trigger signals on line 136.

The first generating means 20 is not limited in its operation at low engine speeds however, the frequency multiplier 40 has a limited capture and lock range, i.e., is capable of multiplying the timing control signals only within a limited range of engine speeds. Accordingly, in order to provide ignition timing during engine start up as well as up through some intermediate low speed range beyond which the multiplier 40 can obtain lock, a dual ignition trigger source is provided by the system. As previously mentioned, the leading edge 28 of slots 26 in disc 24 correspond to the reference position for the most advanced timing for the engine cylinder 13. The width of the slot 26 is selected such that the trailing edge thereof corresponds to the retarded start timing position for cylinders 13. The fixed ignition timing pulses for providing ignition timing during start up conditions are delivered on line 128 to one control input of switch 126. When the speed of crankshaft 33 (and therefore the engine speed) as sensed by sensing means 35 is below a prescribed value corresponding to start up and low engine speeds, the frequency to voltage converter 142 delivers a signal on line 68 to a control input of 126 enabling the reference pulses on line 128 to be gated through on line 136. When the speed of crankshaft 33 increases to a point above the low engine speed value requiring fixed ignition timing, the state of line 68 changes, thereby causing switch 126 to block the reference pulses on 128 while allowing the variable ignition timing signals present on line 67 to be gated through switch 126 to line 136.

While a preferred embodiment of this invention has been disclosed, it will be apparent to those skilled in the art, that changes may be made to the invention as set forth in the appended claims, and in some instances, certain features of the invention may be used to advantage without corresponding use of other features. Accordingly, it is intended that the illustrative and descriptive material therein be used to illustrate the principles of the invention and not to limit the scope thereof.

Having thus described the invention, what is claimed is:

1. In an ignition timing control system for an internal combustion engine including the combination of a plurality of combustion cylinders, a crankshaft and a spark plug associated with each of the cylinders for initiating combustion of fuel, the improvement comprising:

first means for generating a plurality of reference pulses, each of said reference pulses being associated with the ignition timing in one of said cylinders, the timing duration of said pulses being substantially constant, the leading edge of each of said reference pulses corresponding to the maximum ignition timing advance for the associated cylinder;

second means for generating selectively variable timing signals using said references pulses;

means for producing ignition trigger signals resulting in firing of the spark plugs, including means for outputting said trigger signals in response to said reference pulses when the speed of said engine is less than a preselected value and for outputting said trigger signals in response to said selectively variable timing signals when the speed of said engine is at least as great as said preselected value;

means for detecting incremental rotation of said crankshaft and for converting the detected incremental rotation of said crankshaft to an electrical signal having a frequency corresponding to the detected incremental rotation; and means for multiplying the frequency of said electrical signal including a phase-locked loop and a programmable binary counter connected with said phase-locked loop and wherein said second generating means includes means for converting the multiplied frequency of said electrical signal to a timing control signal having a voltage proportional to said multiplied frequency.

2. In an ignition timing control system for use with an internal combustion engine including the combination of a plurality of combustion cylinders, a spark plug associated with each cylinder for producing combustion of fuel in said cylinder, a crankshaft coupled with each of said cylinders, and a source of electrical power for providing ignition signals to said spark plugs, the improvement comprising:

first means for generating a plurality of first reference signals having fixed timing and being respectively associated with fixed ignition timing of the combustion in said cylinders;

second means for generating a plurality of second reference signals having variable timing and being respectively associated with variable ignition timing of combustion in said cylinders;

means for sensing the speed of said crankshaft, and for producing a timing control signal having a frequency proportional to the sensed speed; and, means for producing trigger signals for triggering said power source to provide said ignition signals, said producing means including means responsive to said speed sensing means for outputting said trigger signals in accordance with the timing of said first reference signals only when the speed sensed by said speed sensing means is less than a prescribed value and for outputting said trigger signals in accordance with the timing of said second reference signals only when the speed sensed by said speed sensing means is at least as great as said prescribed value;

said producing means including an electrically controllable switch having an output for outputting said trigger signals and first and second inputs for controlling the operation of said output, said first input being coupled with said first generating means for receiving said first reference signals, said second input being coupled with said second generating means for receiving said reference signals; and means for multiplying the frequency of said control signal and means for converting the multiplied frequency of said control signal to a voltage, said converting means including means for outputting an electrical signal when said voltage exceeds a prescribed value, said switch having a third input for receiving said electrical signal from said converting means, the timing of the trigger signals output from said switch being determined by the state of said electrical signal output from said converting means.

3. An ignition timing control system for an internal combustion engine having a plurality of combustion cylinders and a crankshaft coupled with each of the cylinders, comprising:

means for generating reference signals associated with the ignition timing in said cylinders, said reference signals corresponding to an advanced state of ignition timing;

means for sensing incremental rotation of said crankshaft and for producing timing control signals in accordance with the sensed incremental rotation of said crankshaft, said means for sensing, including means for multiplying the frequency of said timing control signals and means for converting the frequency of said timing control signals to a voltage proportional to said frequency;

means coupled with said generating means and said sensing means for generating a plurality of multi bit data words using said reference signals and said timing control signals, said data words representing instantaneous rotational positions of said crankshaft;

means for converting said data words to analog signals in accordance with a preselected ignition advance schedule;

means for comparing the magnitude of said analog signals with the magnitude of said timing control signals for outputting timing signals when the magnitude of said analog signals is at least as great as the magnitude of said timing control signals; and, means for producing ignition trigger signals for initiating combustion in said cylinders, including means outputting said trigger signals in accordance with the timing of said first reference signal only when the rotational speed of said crankshaft is less than a prescribed value and for outputting said trigger signals in accordance with the timing of said timing signals output from said comparing means only when the rotational speed of said crankshaft is at least as great as said prescribed value.

4. An ignition timing control system for an internal combustion engine having a plurality of combustion cylinders and a crankshaft coupled with each of the cylinders, comprising:

means for generating reference signals associated with the ignition timing in said cylinders, said reference signals corresponding to an advanced state of ignition timing;

means for sensing incremental rotation of said crankshaft and for producing timing control signals in accordance with the sensed incremental rotation of said crankshaft;

means coupled with said generating means and said sensing means for generating a plurality of multi bit data words using said reference signals and said timing control signals, said data words representing instantaneous rotational positions of said crankshaft;

means for converting said data words to analog signals in accordance with a preselected ignition advance schedule;

means for comparing the magnitude of said analog signals with the magnitude of said timing control signals and for outputting timing signals when the magnitude of said analog signals is at least as great as the magnitude of said timing control signals; and, means for producing ignition trigger signals for initiating combustion in said cylinders, including means outputting said trigger signals in accordance with the timing of said first reference signal only when the rotational speed of said crankshaft is less than a prescribed value and for outputting said trigger signals in accordance with the timing of said timing signals output from said comparing means only when the rotational speed of said crankshaft is at least as great as said prescribed value;

said converting means including a demultiplexer; and said means for generating said multi-bit data word including a phase-locked loop and a programmable counter coupled with said phase-locked loop.

5. The system as recited in claim 1, wherein said first generating means includes:

a member adapted to be rotated and having a plurality of slots therein respectively associated with said cylinders, each of said slots being defined by a leading edge and a trailing edge circumferentially spaced from said leading edge relative to the axis about which said member is rotated; and means for sensing the rotation of said leading and trailing edges and for outputting one of said reference pulses upon sensing the rotation of the leading and trailing edges of one of said slots relative to a fixed location about said axis.

6. The system as recited in claim 5, wherein:

said member includes a circular disk;

said leading and trailing edges of each of said slots extend generally radially from said axis; and said sensing means includes an optical sensor.

7. The system as recited in claim 1, wherein said detecting means includes a magnetic pick-up device adapted to detect the rotation of a tooth of a gear driven by said crankshaft.

8. The system as recited in claim 1, wherein said second generating means includes:

means for developing a plurality of multibit data words each representing a rotational position of said crankshaft relative to the position of said cylinders;

means for converting each of said data words to an analog signal in accordance with a preselected ignition advance schedule; and means for comparing the magnitude of said control signal with the magnitude of said analog signal and for outputting said variable timing signal when the magnitude of said control signal is at least as great as the magnitude of said analog signal.

9. The system as recited in claim 8, wherein said developing means includes a preset counter for converting said reference signals into binary format and said converting means includes a demultiplexer coupled with said preset counter.

10. The system as recited in claim 1, wherein said means for producing trigger signals includes an electrically controllable switch having a first control input controlled by said first generating means and a second control input controlled by said second generating means, and an output for delivering said trigger signals, said output being controlled by the state of said first and second control inputs.

11. The system as recited in claim 2, wherein said second generating means includes:

means for developing a plurality of multibit, binary data words, each of said words representing the rotational position of said crankshaft;

means for converting each of said data words to an electrical analog signal;

means for converting the frequency of said control signal to a voltage proportional to said frequency; and means for comparing the magnitude of said voltage with the magnitude of said analog signal and for delivering a control signal to said producing means when the magnitude of said analog signal exceeds the magnitude of said voltage.

12. The system of claim 2, wherein said frequency multiplying means includes a phase-locked loop and a programmable counter coupled with said phase locked loop for selecting the multiple by which said frequency is multiplied.

13. The system as recited in claim 3, wherein said generating means includes a rotating member having a pair of circumferentially spaced reference marks thereon and means for sensing the passage of said reference marks.

14. The system of claim 3, wherein said sensing means includes a magnetic pick-up adapted to sense the rotation of a gear member driven by said crankshaft.

* * * * *